J. F. MOELLER.
LEAF STEMMING AND BOOKING MACHINE.
APPLICATION FILED OCT. 4, 1918.
1,400,228.
Patented Dec. 13, 1921.
3 SHEETS—SHEET 1.
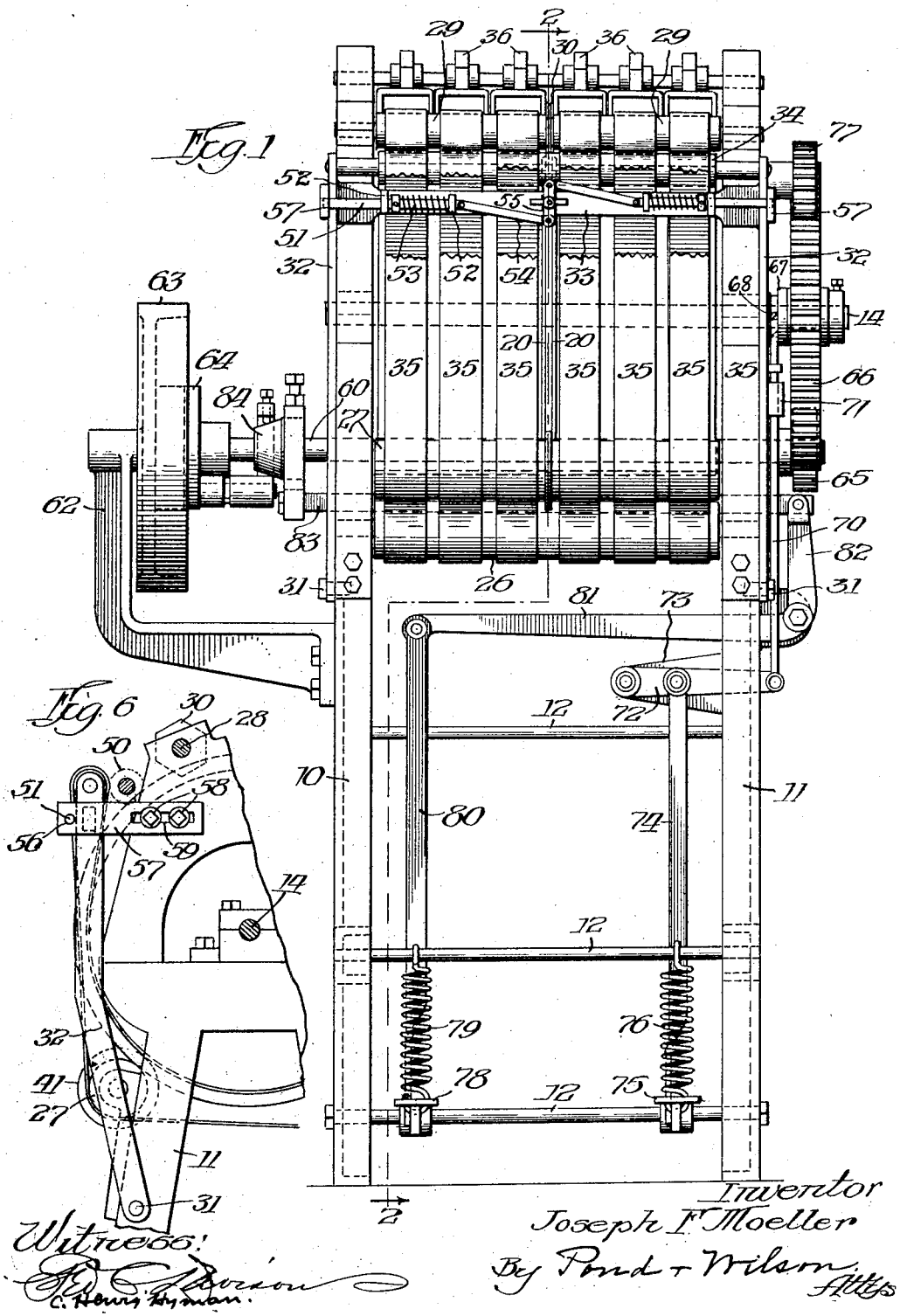
Inventor
Joseph F. Moeller

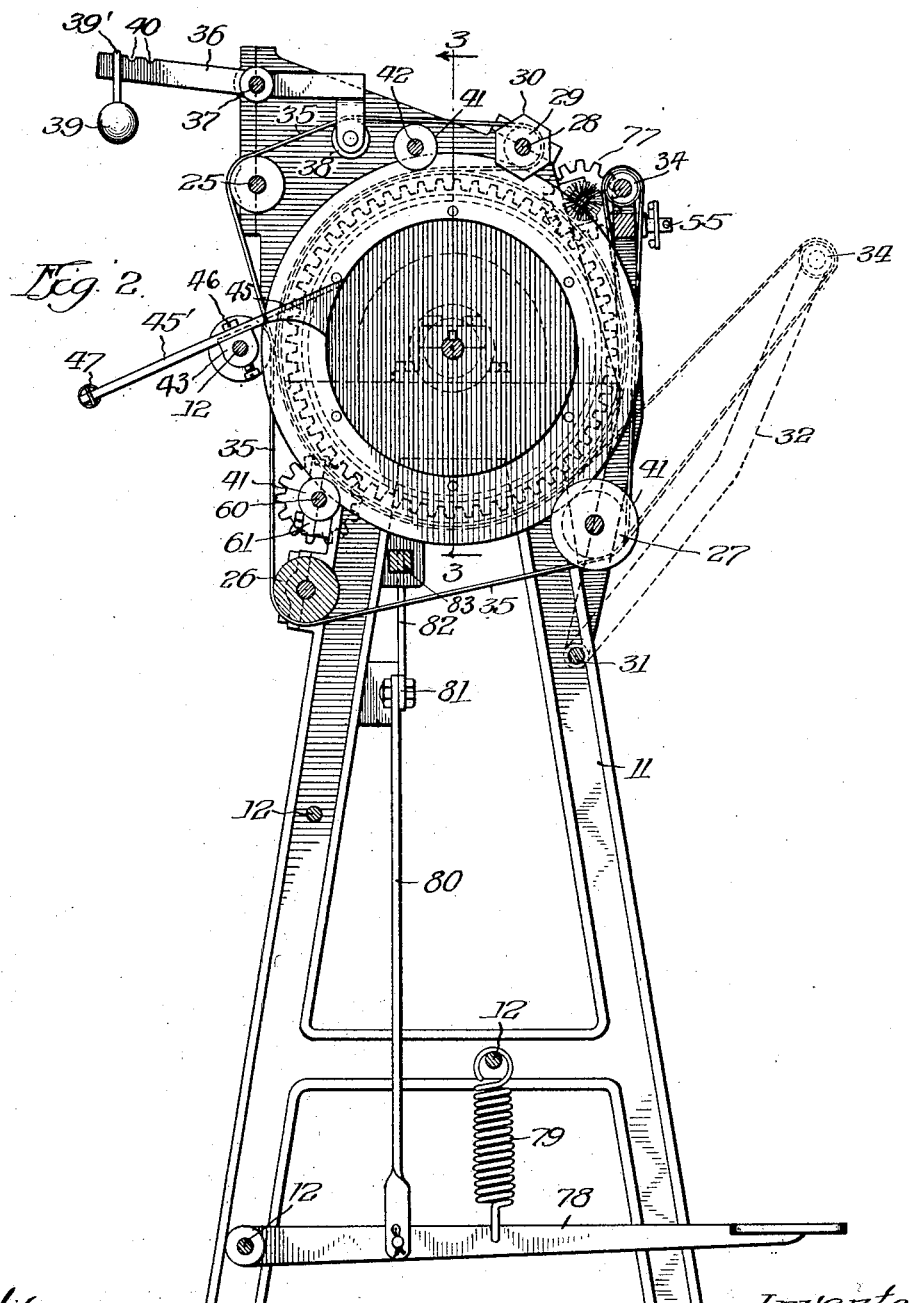

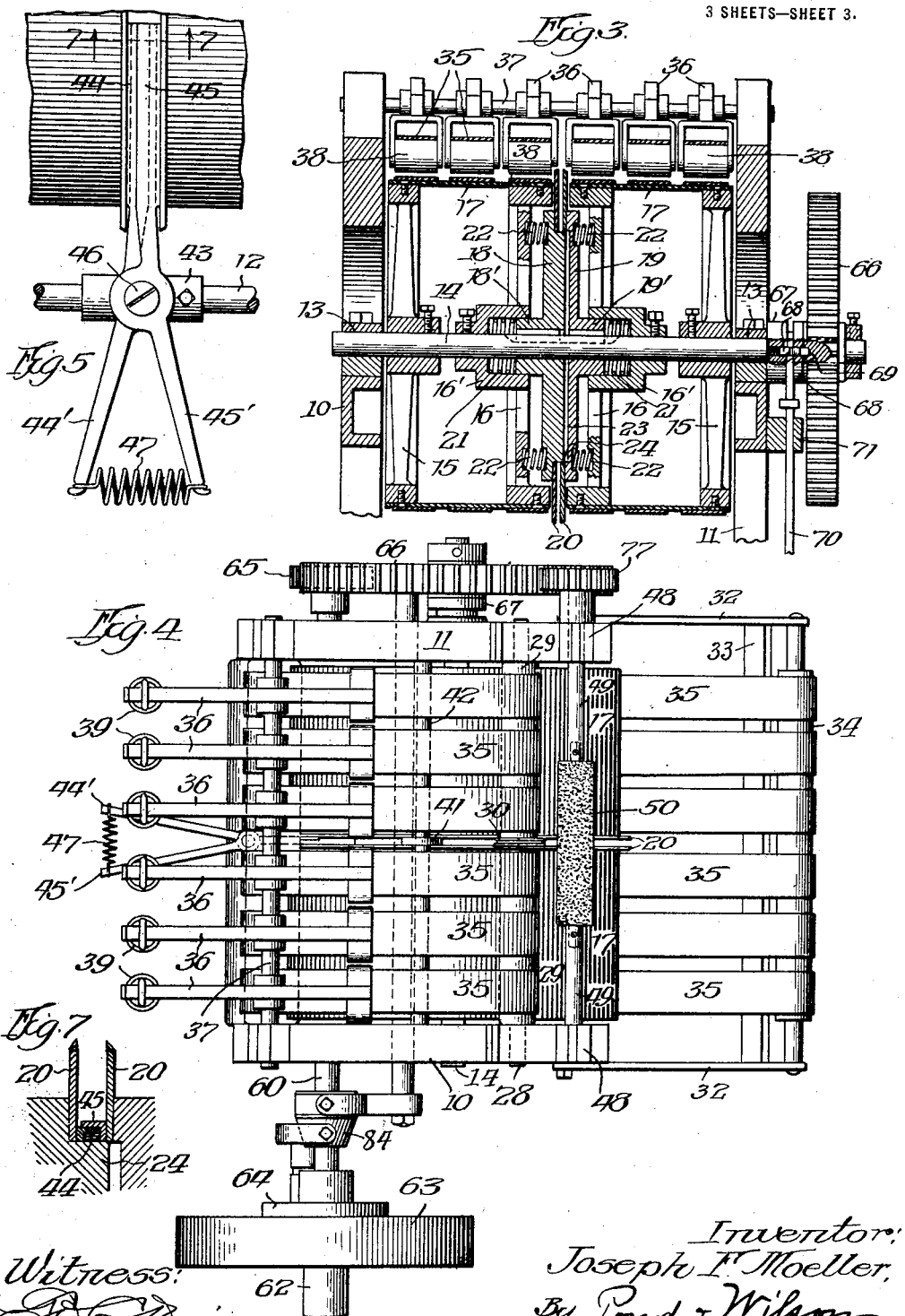

UNITED STATES PATENT OFFICE.

JOSEPH F. MOELLER, OF CHICAGO, ILLINOIS.

LEAF STEMMING AND BOOKING MACHINE.

1,400,228.   Specification of Letters Patent.   Patented Dec. 13, 1921.

Application filed October 4, 1918. Serial No. 256,872.

*To all whom it may concern:*

Be it known that I, JOSEPH F. MOELLER, a citizen of the United States, residing at Chicago, in the county of Cook and State of Illinois, have invented certain new and useful Improvements in Leaf Stemming and Booking Machines, of which the following is a specification.

This invention relates to machines for stemming and booking the leaves of tobacco and other plants. The present machine belongs to that general type of leaf stemming and booking machines which employs a rotary booking drum or cylinder provided with annular flanges between which a rotary cutter operates to sever the stem from the leaf, and a series of endless belts trained around the major portion of the drum surface and coöperating with the latter to build up the successive leaf sections in booked form on opposite sides of the cutting flanges, the front section of the belts being mounted on a hinged frame or belt-carrier that can be swung away from the drum surface to permit the easy removal of the booked leaves.

In most machines of this type the stem severing or stripping element is located more or less in rear of the point at which the belts and drum grip the leaf on opposite sides of the stem, the purpose of this arrangement being to stretch the stem transversely before it is severed. In many instances, and particularly when handling the more fragile leaves, this stretching results in a rupture of the leaf at a greater or less distance from the stem, thus wasting stock and lessening the usefulness of the leaf as a binder or wrapper for cigars. One object of the present invention is to produce a machine in which this waste and injury to the leaf shall be avoided, and this I accomplish by a construction wherein the stem is severed at a point in advance of the nip of the belts and drum on the two halves of the leaf on either side of the stem. Other objects of the invention are to provide an improved mechanism for excising the stem from the leaf, to provide an improved device for ejecting the excised stem from between the cutting flanges of the drum which shall have the further function of automatically keeping the flanges clean and free from accumulations of gum, to provide an improved means for insuring the passage of the leaf, as it is fed into the machine, between the booking belts and the drum, to provide an improved and easily manipulated locking device for the hinged belt-supporting frame, to provide an improved belt-tensioning mechanism, and, generally, to provide an improved and simplified leaf stemming and booking machine of the general type referred to.

These and other objects and advantages of the invention will be apparent to those skilled in the art from the following detailed description, taken in connection with the accompanying drawings forming a part of this specification wherein I have illustrated one practical and workable embodiment of the invention, and in which—

Figure 1 is a front elevation of the machine;

Fig. 2 is a vertical transverse section on the line 2—2 of Fig. 1;

Fig. 3 is a vertical longitudinal section on the line 3—3 of Fig. 2;

Fig. 4 is a top plan view, showing the hinged belt-supporting frame or apron of the machine in open position for the withdrawal of the booked leaves;

Fig. 5 is an enlarged detail in top plan of the stem-ejector;

Fig. 6 is an enlarged fragmentary view in side elevation showing the adjustable keeper for the apron lock.

Fig. 7 is a sectional detail, taken on the line 7—7 of Fig. 5.

Referring to the drawings, 10 and 11 designate a pair of vertical side-frame members, connected and spaced by tie-rods 12. In bearings 13 (Fig. 3) carried by said frame members is journaled a shaft 14, keyed on which are a pair of mating drum sections, each comprising outer and inner spiders 15 and 16 and a circular circumferential wall 17. The proximate ends of the drum sections are slightly separated, and between the same are interposed a pair of disks 18 and 19, the hubs 18' and 19' of which are splined on the shaft 14 and slidably engage the recessed or socketed hubs 16' of the drum spiders 16. The disks 18 and 19 carry circumferential flange-like blades 20 that project between the proximate ends of the drum sections slightly beyond the circumference of the latter and are yieldably pressed toward each other by springs 21 and 22. By reason of this construction it will be seen that a spreading or contracting movement of the blades 20 can take place without involving any endwise movement of either drum section on the shaft, which is impossible where the blades or flanges are directly mounted on the inner or proximate ends of the drum sections. On the inner face of the disk 19 is a shallow circular recess 23, and on the corresponding face of the disk 18 is a circular protuberance or boss 24 that spans the space between the inner edges of the blades 20 and forms a bottom wall for the annular space or channel between said blades, for a purpose hereinafter explained. 25, 26 and 27 designate three rollers grouped around and disposed parallel with the drum, and having their gudgeons journaled in suitable bearings in the side-frame members 10 and 11. On a rod or shaft 28 mounted in and between the side-frame members above the drum are loosely mounted a pair of roller sections 29, between the proximate ends of which is also loosely mounted on the shaft 28 a cutter disk 30 more particularly hereinafter described. Pivoted at 31 (Fig. 1) to the outer sides of the side-frame members 10 and 11 is a swinging frame comprising parallel upright bars 32 and a cross-connecting bar 33, and in the upper end of this frame are journaled the gudgeons of another roller 34. Trained around the rollers 29, 25, 26, 27 and 34 and the major portion of the circumference of the drum sections are a series of endless booking belts, herein shown as six in number, although a greater or less number may be employed, said belts being designated by 35. The pivoted frame 32, 33, and the roller 34 and portion of the belts 35 carried thereby are usually, in machines of this type, designated as the apron of the machine. The several belts 35 are individually tensioned by independent tensioning devices most clearly shown in Figs. 2 and 4 and each comprising a lever 36 pivoted on a rod 37 mounted in and between the upper rear corners of the side-frames 10 and 11, the forwardly projecting arm of the lever carrying a roller 38 engaging beneath the upper or outer lap of the belt, and the rearwardly projecting arm of the lever carrying a suspended weight 39 adjustable toward and from the pivot of the lever by notches 40 engageable with the hooked stem 39' of the weight 39. By this means all slack in the belts is continuously taken up, and the inner or drum-engaging lap of each belt is allowed to expand under proper tension as the book is built up between the belts and the surface of the drum.

The cutter disk 30 is preferably of polygonal form in peripheral outline, as shown in Fig. 2, and its peripheral portion lies between the drum blades or flanges 20 so as to effect a shearing action with the latter on opposite sides of the stem of the leaf. The cutter disk is rotated wholly by the friction of the blades 20 thereon, and the periphery of the disk is preferably channeled or grooved, as shown in Figs. 1 and 4, to give it a guiding action on the stem and cause the latter to track properly with the cutting mechanism. It will be observed by reference to Fig. 2 that the cutter disk 30 is so located in advance of the nip of the booking belts and drum that the severing of the stem takes place before the portions of the leaf on either side of the cutter have passed into the grip of the belts and drum. This I regard as an important feature of the present invention, since, by avoiding the transverse stretching of the leaf by the inner belts over the projecting drum blades or flanges before cutting, I avoid the rupture and tearing of the leaf that frequently occurs under such conditions.

The drum blades or flanges 20 are uniformly spaced apart against the action of the springs 21 and 22 by three spacing rollers 41, best shown in Fig. 2; one of which is loose on the driving shaft, hereinafter referred to, another is loose on the belt roller 27, and the third is loose on a cross-rod 42 directly over the drum. These spacing rollers, the peripheral portions of which enter between the blades 20, are of substantially the same thickness as the cutter disk 30.

Keyed on one of the tie-rods 12 of the machine frame is a sleeve 43 having a flattened upper side, on which is mounted a device for ejecting the severed stems from between the drum flanges 20. This stem-ejector, which is best shown in the enlarged detail views, Figs. 5 and 7, is a generally scissors-like device, comprising a pair of overlapping blades 44 and 45 mounted by a pivot-screw 46 on the sleeve 43 and provided with rearwardly extending handles 44' and 45', respectively, connected by a tensile spring 47. The forward end portions of the blades 44 and 45 enter the space between the drum flanges 20 and at their ends rest on the periphery of the disk boss or protuberance 24 which forms the bottom wall of the annular channel formed by said flanges. This bottom wall limits the depth to which the severed stems can enter below the periphery of the drum, and as each stem, during the turning movement of the drum, encounters the ejector blades or fingers 44 and 45, it is directed outwardly by and over the latter, falling to the floor or into a suitable receiver in rear of the machine. The tension of the spring 47 holds the outer edges of the blades 44 and 45 snugly against the inner faces of the drum flanges 20, producing a scraping action on the latter which keeps them clean and free from the gum which would otherwise accumulate thereon under long continued use of the machine.

Referring to Fig. 4, in bearings 48 on the side-frame members 10 and 11 are journaled a pair of alined shaft sections 49, in and between the proximate ends of which is mounted a cylindrical brush 50 that rotates at a relatively high speed and in a direction opposite that of the drum. The purpose of this brush is to facilitate the entrance of the forward ends of the leaf sections, after the stem has been severed, into the nip of the booking belts and drum, and prevent them from curling downwardly between the drum and the apron. This brush 50 is located, as shown in Fig. 2, slightly in advance of and below the cutter 30.

The apron of the machine is locked in position against the front surface of the booking drum by the locking mechanism illustrated in Figs. 1 and 6, and comprising a pair of locking bolts 51 slidably mounted in bearing lugs 52 on the cross-bar 33 of the apron frame and urged outwardly by springs 53. The inner ends of the bolts 51 are connected by links 54 to a pivoted turn-button 55; and the outer ends of the bolts engage holes 56 in the outer ends of keeper bars 57 (Fig. 6). These keeper bars are adjustably secured to the outer sides of the side-frame members 10 and 11 by binding screws 58 passing through a longitudinal slot 59 in the keeper bar.

60 designates the driving shaft of the machine, the same being journaled in bearings 61 on the side-frame members and in a bearing bracket 62 secured to the side-frame member 10. On the driving shaft is a drive pulley 63 controlled by an expansion ring clutch 64 of a well known type and forming no part of the present invention. Keyed on the other end of the driving shaft is a pinion 65 that meshes with a large spur gear 66 loosely mounted on the drum shaft 14 and drivingly connected to the latter through a well known form of automatic clutch by which the gear is disengaged from the shaft once during each complete revolution, and comprising an annularly grooved collar 67 fast on the shaft and carrying a spring-pressed sliding pin 68 that enters a hole 69 in the hub of the gear, said pin having an oblique slot lying across the groove of the collar and engaged by the upper end of a rod 70 once at each revolution of the shaft to withdraw the pin. The rod 70 is slidably mounted in a guide 71 on the side-frame member 11 (Fig. 1), and at its lower end is connected to a lever 72 pivoted on a bracket 73; said lever 72 being connected by a link 74 to a pedal arm 75, this latter being normally upheld by a tensile spring 76. By depressing the pedal 75 the rod 70 is retracted from the pin 68, and the latter is forced by its spring into engagement with the hub of the gear 66, thereby locking the latter to the drum shaft.

77 designates a pinion fast on one end of the brush-shaft 49 and meshing with and driven by the large gear 66.

78 designates a foot-pedal, similar to the pedal 75, that is pivoted at its rear end on one of the tie-rods 12 and is normally upheld by a tensile spring 79. To the lever 78 is pivoted the lower end of a link 80, the upper end of which is pivoted to the horizontal arm 81 of an elbow lever, the vertical arm 82 of which lever is connected to one end of a link 83 that at its other end is connected to and actuates a sliding cone 84 on the drive shaft 60 by which the expansion-ring clutch 64 is operated. This clutch is thrown in and the drive established and maintained by pressure of the operator's foot on the pedal 78, the clutch being released and the drive stopped by the spring 79 when the foot is withdrawn from the pedal.

In the operation of the machine, the parts being positioned as shown in Fig. 1 and in full lines in Fig. 2, the foot of the operator is placed on the pedal 78, thereby establishing the drive through the clutch 64. The leaves are then successively fed into the machine, either butt foremost or point foremost, but preferably the former, the end of the stem being introduced into the nip of the cutting mechanism by which the leaf is drawn in until the forward ends of the severed halves of the leaf are gripped between the belts and the drum. As the leaf is drawn into the machine, the stem is excised by the shearing action of the cutting disk 30 and the drum blades 20, the severed stem passing down between the blades 20 until its forward end encounters the inner end of the ejector, by which the stem is forced outwardly on the rear side of the drum and is discharged on to the floor or into any suitable receptacle. The two halves of the leaf during this time are smoothly laid and compressed on the rear side of the drum between the latter and the belts. During this operation the rapid rotation of the brush 50 urges the forward ends of the sides of the leaf forward into the nip of the belts and drum, and prevents them from curling or bunching up in advance of the point of entry between the belts and drum. As soon as each leaf has been completely booked, the rotation of the drum is automatically arrested by the clutch bar 70; and the operator, as soon as the next leaf is ready for entrance to the machine, depresses the pedal 75, thus starting up the drum, and when the forward end of the preceding booked leaf reaches the nip of the belts and drum, the second leaf is entered and passed through the machine in the same way, the stem being excised and ejected, and the two halves of the leaf being directly superposed on the preceding leaf sections by the pressure of the belts. In this way a number of leaves are passed through the machine until books of the required size and thickness have accumulated on the drum, the belts yielding outwardly from the surface of the drum while maintaining a constant pressure on the booked leaves in a manner well understood in machines of this type. When books of the required size have thus been built up, the machine is stopped, the apron is unlocked by manipulating the turn-button 55 to retract the locking bolts 51, the apron is swung outwardly to the dotted line position shown in Fig. 2, and by a slight backward turning movement of the drum the booked leaves may be readily withdrawn from the front of the machine.

I have found that by cutting the stem in advance of the point at which the leaf is gripped and drawn into the machine, the transverse stretching of the leaf by the innermost belts, and the consequent danger of tearing the same, are avoided, so that the stem emerges clean and with practically no waste leaf adhering thereto. The polygonal form of cutting disk, driven by friction contact with the drum blades, effects a more perfect shear cut than a circular disk, although fair results are obtainable with the latter. The cutting effect is improved by means of the spacing rollers 41 between the drum blades, since these spacing rollers maintain the outer edges of the drum blades in perfect parallelism throughout, and insure a close shearing action between the coöperating edges of the disk and the blades. The stem ejector not only efficiently performs its main function of ejecting the stem, but it also, through its scraping action on the inner faces of the drum blades, keeps the latter clean and free from accumulations of gum. The mandrel or core 24, by spanning the space between the inner edges of the annular blades 20, prevents the stems from lodging and accumulating in the space between the drum sections. I am aware that the use of belt tensioning devices in machines of this type is broadly old and known, but the individual tension devices here shown, each capable of independent adjustment, effect a more perfect booking of the leaves; and their location as shown and described, affords a maximum of ease and convenience in the matter of adjusting the tension when necessary. Furthermore, the mechanism shown and described for locking the apron in closed position and for releasing it therefrom also affords a maximum of convenience, since it is easily accessible and can be quickly manipulated by one hand of the operator.

It is believed that the structure, mode of operation, and chief advantages of the invention will be readily understood from the foregoing description. Manifestly the machine may be modified and varied in respect of specific details of construction without involving any departure from the essential features of the invention or sacrificing any of the advantages secured thereby. Hence, it should be understood that the invention is not limited to the specific details of the embodiment herein selected for purposes of illustration, but includes all such modifications and variations as fall within the spirit and purview of the appended claims.

I claim:

1. In a leaf stemming and booking machine, the combination of a booking drum having a pair of spaced circumferential flange-like blades, booking belts coöperating with said drum on opposite sides of said blades respectively, and a rotary cutter coöperating with said blades to excise the stem and located in advance of the point at which said belts and drum grip the leaf.

2. In a leaf stemming and booking machine, the combination of a booking drum having a pair of spaced circumferential flange-like blades, booking belts coöperating with said drum on opposite sides of said blades respectively, and a rotary cutting disk having its peripheral portion entering between and coöperating with said blades to excise the stem, said cutting disk being located in advance of the point at which said belts and drum grip the leaf and driven by frictional contact with said blades.

3. In a leaf stemming and booking machine, the combination of a pair of coaxial drum sections, spaced annular blades between the proximate ends of said drum sections and projecting beyond the periphery of the latter, a mandrel or core spanning the space between the inner peripheries of said blades, booking belts coöperating with said drum sections on opposite sides of said blades respectively, and a cutter coöperating with said blades to excise the stem.

4. In a leaf stemming and booking machine, the combination of a drum shaft, a pair of drum sections keyed on said shaft, a pair of disks splined on said shaft between said drum sections and carrying annular blades projecting between the proximate ends of said drum sections, one of said disks having a mandrel or core spanning the space between the inner peripheries of said blades, spring means urging said disks toward each other, booking belts coöperating with said sections on opposite sides of said blades respectively, and a cutter coöperating with said blades to excise the stem.

5. In a leaf stemming and booking machine, the combination of a drum shaft, a pair of drum sections keyed on said shaft, a pair of disks splined on said shaft between said drum sections and carrying annular blades projecting between the proximate ends of said drum sections, one of said disks having a mandrel or core spanning the space between the inner peripheries of said blades, spring means urging said disks toward each other, spacing rollers between said blades disposed at intervals around the circumference of the latter, booking belts coöperating with said drum sections on opposite sides of said blades respectively, and a cutter coöperating with said blades to excise the stem.

6. In a leaf stemming machine, the combination with a pair of spaced circular blades, and a cutting element coöperating therewith to shear the stem from the leaf, of a transversely expansible stem ejector lying between said blades.

7. In a leaf stemming machine, the combination with a pair of spaced circular blades, and a cutting element coöperating therewith to shear the stem from the leaf, of a device for ejecting the severed stem from between said blades comprising a pair of lapped pivoted fingers lying between said blades, and a spring urging said fingers into scraping contact with the inner opposed faces of said blades.

8. In a leaf stemming machine, the combination with a pair of spaced annular blades, of a cutting element coöperating with said blades to shear the stem from the leaf, a mandrel spanning the space between the inner peripheries of said blades, and a transversely expansible stem ejector entering between said blades and at its inner end lying against the periphery of said mandrel.

9. In a leaf stemming machine, the combination with a pair of spaced annular blades, of a cutting element coöperating with said blades to shear the stem from the leaf, a mandrel spanning the space between the inner peripheries of said blades, and a stem ejector comprising a pair of lapped pivoted fingers lying between said blades and against the periphery of said mandrel, and a spring urging the outer edges of said fingers into scraping contact with the inner opposed faces of said blades.

10. In a leaf stemming and booking machine, the combination of a frame, a booking drum journaled in said frame and having flange-like blades projecting beyond the circumference thereof, booking rollers and belts coöperating with said drum and including a hinged apron portion lying opposite the front of said drum, a cutter mounted above said drum and coöperating with said blades to sever the stem from the leaf, and a rotary brush journaled in said frame and disposed between said cutter and the upper end of said hinged apron portion.

11. In a leaf stemming and booking machine, the combination of a main frame, a booking drum journaled therein, booking belts coöperating with said drum, an apron frame hinged at its lower end to said main frame and supporting a portion of said belts, and means for locking said apron frame to said main frame comprising a pair of spring-pressed locking bolts slidably mounted on said apron frame, and keepers secured to said main frame and formed with holes receiving the outer ends of said locking bolts.

12. In a leaf stemming and booking machine, the combination of a main frame, a booking drum journaled therein, booking belts coöperating with said drum, an apron frame hinged at its lower end to said main frame and supporting a portion of said belts, and means for securing said apron frame in upright position against said main frame comprising a pair of spring-pressed locking bolts slidably mounted on said apron frame, a turn-button pivoted on said apron frame between the inner ends of said bolts, links connecting the inner ends of said bolts to said turn-button, and keepers adjustably secured to said main frame and formed with holes to receive the outer ends of said locking bolts.

13. In a leaf stemming machine, a stem-excising mechanism comprising a pair of co-axial spaced circular blades, and a cutting disk having a polygonal periphery turning between said blades.

14. In a leaf stemming machine, a stem-excising mechanism comprising a pair of co-axial spaced circular blades, springs urging said blades toward each other, and a cutting disk having a polygonal periphery lying between and effecting a shear cutting action with the edges of said blades.

15. In a leaf stemming machine, a stem-excising mechanism, comprising a pair of co-axial annular blades, springs urging said blades toward each other, spacers between said blades maintaining the cutting edges of the latter parallel, and a loosely mounted cutting disk having a polygonal periphery lying between and rotated by frictional contact with said blades and effecting a shear cutting action with the edges of said blades.

JOSEPH F. MOELLER.

Witnesses:
SAMUEL N. POND,
C. HENRY HYMAN.